April 21, 1964     E. J. STANTON     3,130,014
CONTACTING APPARATUS
Filed July 25, 1961
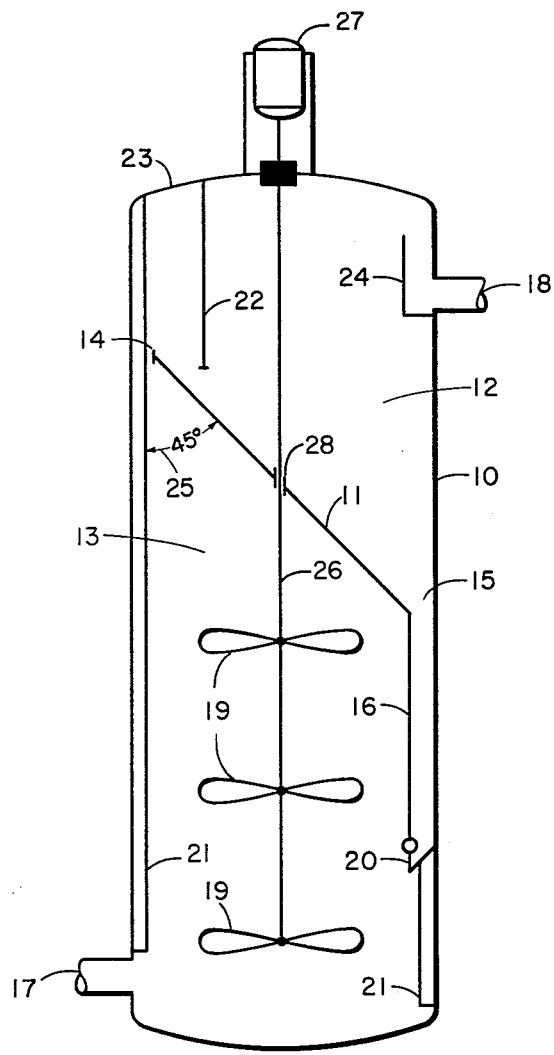
INVENTOR.
Emmanuel J. Stanton

United States Patent Office 3,130,014
Patented Apr. 21, 1964

3,130,014
CONTACTING APPARATUS
Emmanuel J. Stanton, Flossmoor, Ill., assignor to Standard Oil Company, Chicago, Ill., a corporation of Indiana
Filed July 25, 1961, Ser. No. 126,657
1 Claim. (Cl. 23—288)

This invention relates to apparatus for contacting liquids with particulate insoluble solids.

An object of this invention is a liquid-solids contacting apparatus having a turbulent zone wherein liquid is intimately contacted with particulate insoluble solid and a quiescent zone wherein at least a portion of the solid is separated from the liquid leaving the apparatus and is returned to the turbulent zone.

Another object of this invention is an apparatus for intimately contacting liquid reactants with finely divided catalyst in an improved manner and under conditions such as to permit intimate contacting of the reactants with the catalyst and subsequent separation, within the apparatus, of at least a portion of the catalyst from the reaction products and return of the separated catalyst to the contacting zone.

A further object of my invention is a contacting apparatus which provides a means for intimately contacting liquid with particulate insoluble solid at relatively high concentrations of solids in the liquid without the necessity for pumping concentrated slurries with attending erosion and the many other problems associated therewith.

Other objects of the invention will become apparent during the course of the detailed description thereof.

The invention is illustrated by reference to the sole figure which shows a schematic sectional view of a preferred embodiment of my invention.

Referring now to the figure, my apparatus comprises a substantially vertically disposed vessel 10 having a sloping partition 11 positioned within it which partition 11 divides the vessel into an upper portion 12 and a lower portion 13. It is preferred that the partition 11 slope at an angle 25 of about 30°–60°. The partition 11 is provided with a first opening 14 in the upper part of the partition for passage of a liquid-solid stream from the lower portion 13 to the upper portion 12 of the vessel 10. The partition 11 also is provided with a second opening 15, in the lower part of the partition 11 positioned off center of said vessel, and spaced from the first opening 14 for passage of a thickened liquid-solid stream into the lower portion of the vessel. Opening 15 has a dip-leg 16 which is provided with a flapper-valve 20 at the lower extremity thereof. A portion of the inner wall of the vessel 10 may form an integral part of said dip-leg, or the dip-leg may be a separate conduit, independent of the vessel wall.

The vessel 10 is provided with an inlet opening 17 for admitting a fluid stream into a selected point of lower portion 13 of the vessel and an outlet opening 18 for withdrawing a fluid stream from the upper portion 12 of the vessel. A baffle 24 may be positioned within the upper portion 12 of the vessel 10 adjacent the outlet 18 to reduce vortex formation and liquid turbulence and aid in withdrawal of clarified liquid via outlet 18. Propeller agitating means 19, carried by a shaft 26 driven by a motor 27, is provided for intermingling the contents of the lower portion of the vessel. The partition 11 is provided with a third opening 28 through which the agitator shaft 26 passes and in which said shaft 26 is free to rotate.

In this embodiment of my invention the vessel 10 is provided with a plurality of swirl-reducing baffles 21 positioned at the interior vessel wall. Also in this embodiment of my invention, a vertical baffle 22 is positioned between the first opening 14 and the second opening 15 in said sloping partition. This baffle 22 is dependent from the top 23 of the vessel 10 and ends in spaced relation from the sloping partition 11.

In operation, for example in the isomerization of a hexane cut of a light virgin naphtha in the presence of a particulate insoluble solid catalyst to produce neohexane, the hexane charge containing the catalyst in the form of a slurry is passed into the lower portion of the contacting apparatus via inlet 17. For a hexane charge rate of about 14,000 barrels per day vessel 10 is a cylindrical vessel 9 feet in diameter and 25 feet in height provided with a 45° sloping partition 11 having an upper opening 14 for permitting stirred slurry to enter the upper quiescent zone 12 and a second opening 15, with a dip-leg 16 attached thereto, for returning settled solids from the upper quiescent zone 12 to the stirred zone 13 of the contacting vessel. The partition 11 is positioned within the vessel 10 so that the stirrer shaft opening 28 is about 9 feet below the top 23 of the vessel 10. The dip-leg 16 is provided with a flapper valve 20 at the lower extremity thereof to prevent back-flow up through the dip-leg. The stirrer 19 may be driven by a 100-horsepower motor 27 at about 1,500 to 2,000 r.p.m. for obtaining intimate contact of catalyst with charge. The weight ratio of hydrocarbon to catalyst in the lower stirred zone 13 of the contacting vessel is in the range of about 0.5:1 to 2:1, usually about 0.7:1 to 1:1. In the stirred portion 13 of the vessel 10 there may be about 4 to 5 pounds of catalyst per gallon of liquid. The catalyst stream leaving the bottom of dip-leg 16 through flapper valve 20 will contain 8–12 pounds of catalyst per gallon while liquid withdrawn from the upper portion 12 of the vessel 10 through outlet 18 will have only about 0.1 pound of catalyst per gallon. The catalyst may have a particle size in the range of about 4–400 mesh, although about 8–40 mesh particles are usually utilized.

While I have described a specific example of my invention and specific operating conditions in connection therewith, it should be understood that the invention is not limited to this example nor to the described conditions since numerous other modifications and alternative operating conditions will be apparent from the above-detailed description to those skilled in the art.

Thus having described the invention, what I claim is:

An apparatus for intimately contacting liquid with particulate insoluble solid which apparatus comprises in combination an enclosed substantially cylindrical pressure vessel having the longitudinal axis thereof in a substantially vertical position; a single partition positioned within said vessel to divide said vessel into an upper quiescent portion and a lower turbulent portion, which partition has a uniform slope at an angle within the range of about 30–60° from the vertical; said partition being provided with a first opening in the upper part of said partition for passage of liquid-solid stream from said lower portion to said upper portion of said vessel; and said partition being provided with a second opening positioned off center of said vessel, spaced from said first opening and in the lower part of said partition immediately adjacent to the wall of said vessel at the lowest part of said partition; a dip-leg attached to said partition about said second opening for passage of a thickened liquid-solid stream from said upper portion into said lower portion, a portion of the inner wall of said vessel forming an integral part of said dip-leg, said dip-leg being provided with a flapper-valve at the lower extremity thereof; said vessel being provided with an inlet opening for admitting a fluid stream into the lower portion of said vessel and an outlet opening for withdrawing a fluid stream from the upper portion of said vessel; a vertical baffle positioned between said first opening and said second opening in said sloping partition, and dependent from the top of said vessel and ending in spaced relation from said sloping partition; said vessel being provided with a plurality of swirl-reducing baffles positioned at the interior vessel wall; and agitating means for intermingling the contents of said lower portion.

References Cited in the file of this patent

UNITED STATES PATENTS

| | | |
|---|---|---|
| 579,039 | Brashear | Mar. 16, 1897 |
| 2,195,408 | Downes | Apr. 2, 1940 |
| 2,527,750 | MacFee | Oct. 21, 1950 |
| 2,584,910 | Ohlwiler | Feb. 5, 1952 |
| 2,760,850 | Lambert et al. | Aug. 28, 1956 |
| 2,767,847 | Russell et al. | Oct. 23, 1956 |
| 2,768,987 | Hart | Oct. 30, 1956 |
| 2,871,108 | Knapp | Jan. 27, 1959 |
| 2,901,331 | Held et al. | Aug. 25, 1959 |